(No Model.) 3 Sheets—Sheet 2.
F. SIMONSON.
ACETYLENE GAS GENERATOR.
No. 588,535. Patented Aug. 17, 1897.
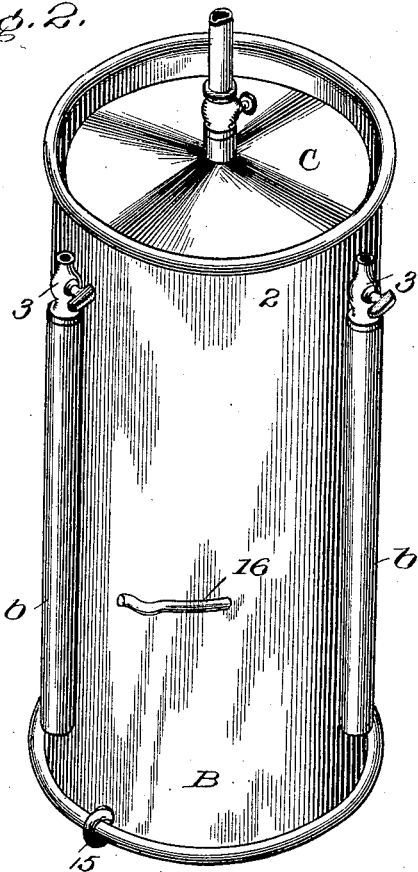
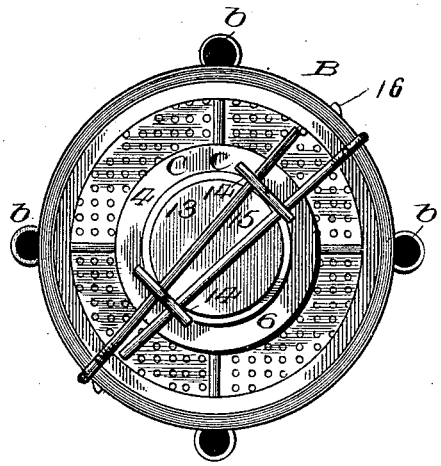
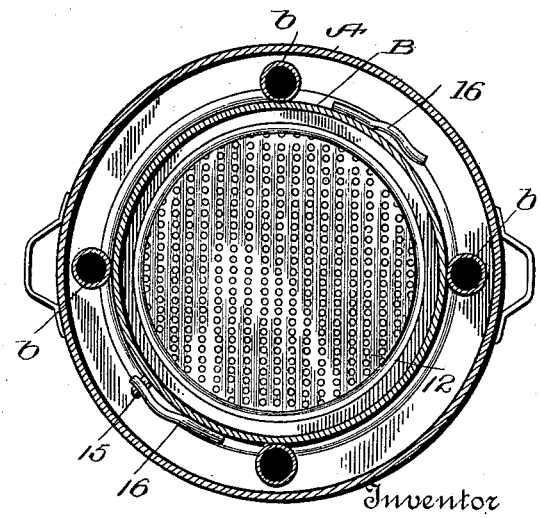
Witnesses
Inventor
Flavel Simonson,
by W^m Hunter Myers,
his Attorney (No Model.) 3 Sheets—Sheet 3.
F. SIMONSON.
ACETYLENE GAS GENERATOR.
No. 588,535. Patented Aug. 17, 1897.
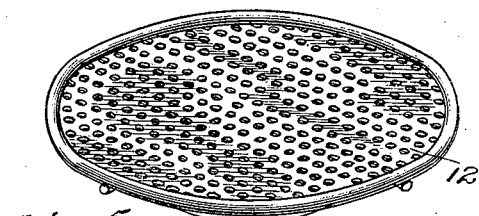
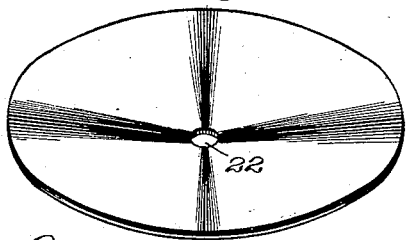
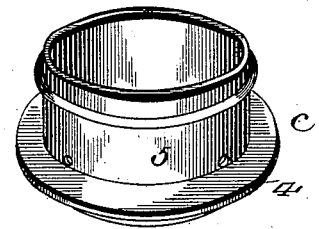
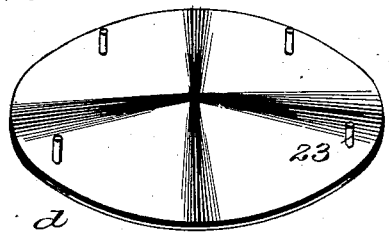
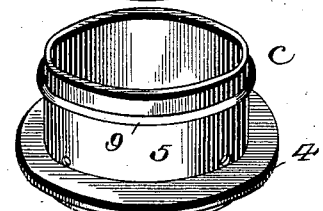
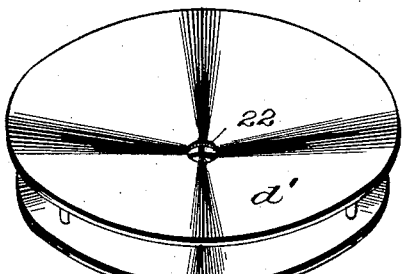
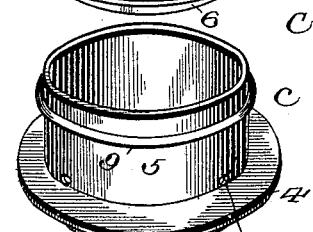
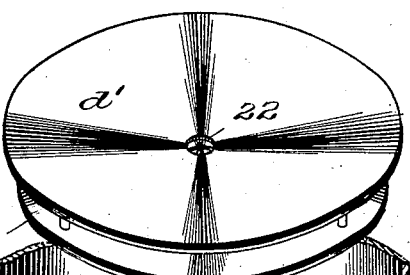
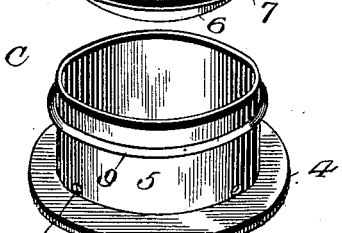
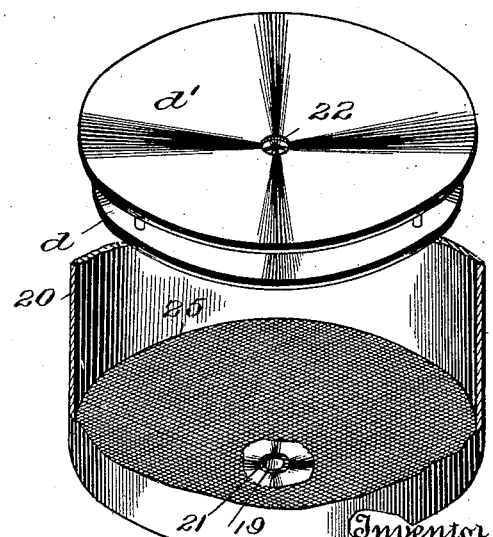
Witnesses
John Irvine
David W. Gould.
Inventor
Flavel Simonson,
by Wm Henster Myers
his Attorney
THE NORRIS PETERS CO., PHOTO-LITHO., WASHINGTON, D. C.

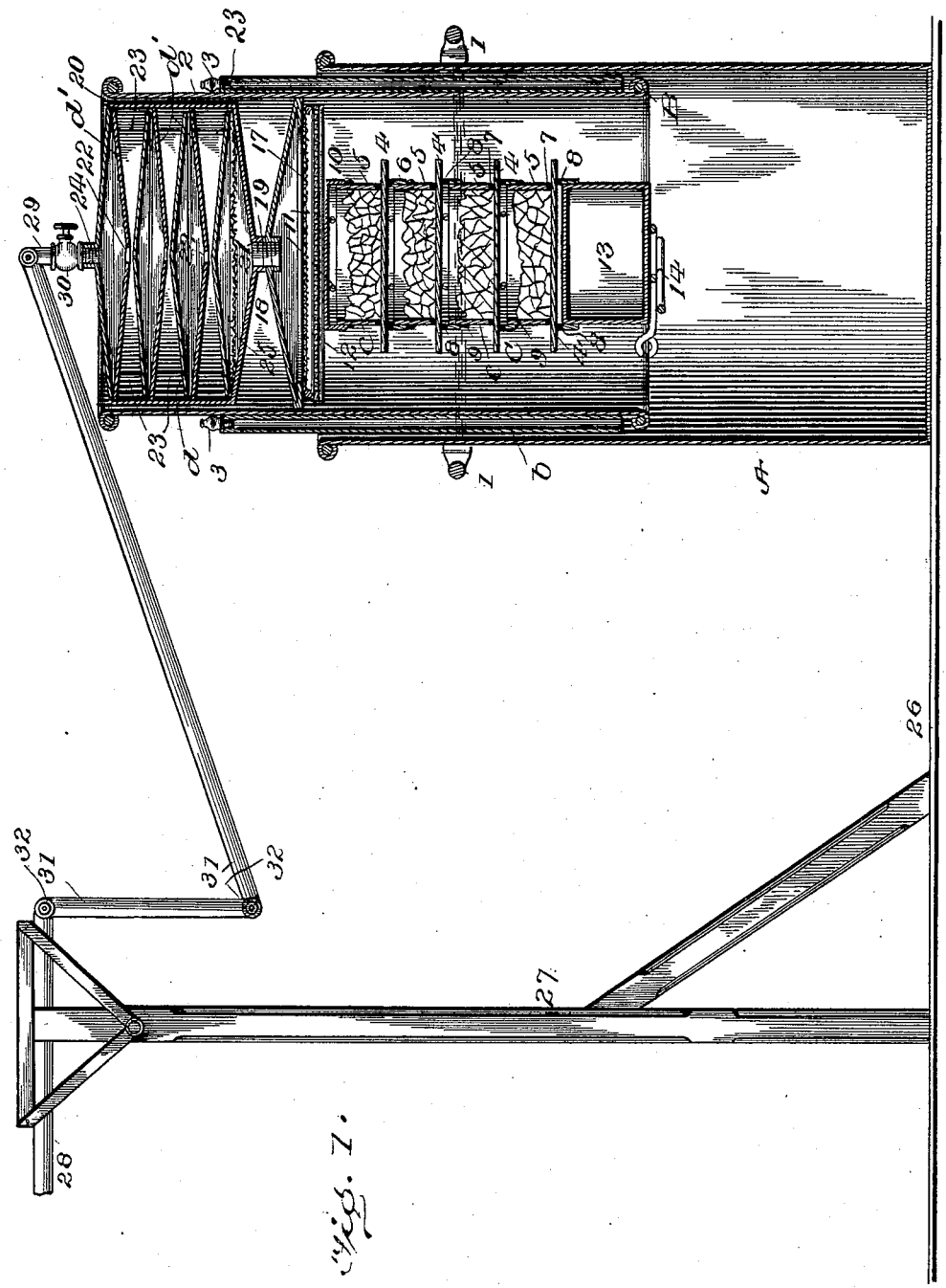

UNITED STATES PATENT OFFICE.

FLAVEL SIMONSON, OF STERLING, ILLINOIS.

ACETYLENE-GAS GENERATOR.

SPECIFICATION forming part of Letters Patent No. 588,535, dated August 17, 1897.

Application filed February 11, 1897. Serial No. 622,998. (No model.)

*To all whom it may concern:*

Be it known that I, FLAVEL SIMONSON, a citizen of the United States, residing at Sterling, in the county of Whiteside and State of Illinois, have invented certain new and useful Improvements in Gas-Making Apparatus, of which the following is a specification, reference being had therein to the accompanying drawings.

My invention relates to an improved apparatus for generating gas on the principle of causing a solid, as calcium carbid, to be chemically affected by a liquid, as water.

One objection to all machines of this class with which I am familiar has been the inability to regulate and control the generation of the gas owing to the fact that vapor rising from the liquid will chemically affect that portion or portions of the carbid not brought into actual contact with the liquid, resulting in the practically constant generation of gas in a greater or less degree as long as any carbid remains in the generator.

Therefore one object of my invention is to produce a generator designed to contain several portions or quantities of the carbid to be successively decomposed by contact with the liquid, each portion being entirely separate and distinct from the rest, the generator being so constructed that the generation of gas through the decomposition of one portion of the carbid cannot materially affect any of the other portions, thus overcoming the above-noted objection.

Another object of the invention is to combine the generator and gas-holder into one receptacle and to provide it with means for partially compensating for its weight in the liquid, so that the slightest excess of pressure will instantly and automatically withdraw the carbid from contact with the liquid and thereby practically arrest the generation of gas.

Another objection in machines of this class is that in generating gas from calcium carbid there is a greasy gum thrown off with the gas, and also infinitely fine particles of carbon are expelled from the carbid and float in the gas. This greasy substance and the particles of carbon deposit themselves in the gas-conduits and in the burners and cause the burners to smoke and emit divided and irregular flames. In order to effectually separate these substances from the gas, it is necessary to subject the latter to a purifying process before it reaches the conduits.

Therefore another object of my invention is to provide a purifier so constructed that the gas as it is generated will be brought into contact with metallic surfaces to which the deleterious substances will adhere, thus permitting the gas to pass to the burners in a purified state, the metallic surfaces being so arranged as to be readily cleansed when required.

The invention consists in a generator made of a number of independent assembled sections each adapted to contain a predetermined quantity of carbid.

The invention also consists in a generator comprising a number of chemical-receiving sections, a gas-holder in which the generator is to be placed, and air-chambers formed on or secured to said holder for partially supporting the latter in the liquid.

The invention also consists in a gas-purifier comprising a vessel having an inlet and an outlet for the gas and a series of metallic plates intermediate the inlet and outlet, these plates being so arranged as to compel the gas to travel in a sinuous path before reaching the outlet.

The invention further consists in certain details of construction and combinations of parts, which will first be described in connection with the accompanying drawings and then pointed out in the claims.

Figure 1 is a vertical central sectional view of my improved gas-making apparatus. Fig. 2 is a perspective view of the gas holder and purifier. Fig. 3 is a bottom plan view of the gas holder and generator, showing the means for locking the latter in the gas-holder. Fig. 4 is a horizontal sectional view through the tank, gas holder, and generator, showing these parts assembled. Fig. 5 is a perspective view of the generator, showing the sections thereof slightly separated. Fig. 6 is a perspective view of the purifier, showing the plates removed from the casing and slightly separated from each other.

Referring to the drawings, A represents a tank, having handles 1 and designed to contain the liquid for chemically affecting the carbid, the handles marking the limit to which the liquid is to be poured into the tank.

B represents the gas-holder, designed for vertical movement in tank A, the holder being closed at top and open at bottom, the vertical wall of the holder extending some little distance above the top, as at 2, for a purpose hereinafter described. To the outer surface of the holder are secured what I term "air-chambers" $b$, designed to partially compensate for the weight of the holder and its attendant parts in the liquid. These air-chambers are small metal tubes, open at bottom and each provided at the upper end with a stop-cock 3, and are secured at equidistant points to the holder B, the air-chambers being further designed to maintain the holder in an upright position during its vertical movement in the tank, thereby dispensing with separate guides for this purpose.

C represents the generator, designed to be removably secured in and combined with the gas-holder B. The generator comprises a number of sections $c$, each consisting of a horizontal plate 4, a ring 5, rising from the upper surface of plate 4 and designed to receive the calcium carbid, this ring being hereinafter termed the "carbid-ring," and a narrower ring 6, depending from the lower side of plate 4. The rings 5 are provided near their lower edges with a series of holes 7, serving to admit water to the interior of the ring, and the rings 6 are provided near their upper edges with a series of holes 8, serving to afford exit for the gas. The sections are assembled by telescoping the ring 5 of one section in the ring 6 of the section next above, the limit of this telescoping movement being reached when the edges of the rings 6 contact with the annular ribs 9, formed on the rings 5. It will be seen by this construction that each section is entirely independent and separate from the other sections and that the generation of gas in one section cannot materially affect the carbid in any other section.

The carbid-ring on the upper section telescopes into a ring 10, having a series of holes 11, depending from a plate 12, perforated to permit the passage of gas and of a size to nearly equal the diameter of the interior of the holder, thus serving as a guide in the introduction of the generator into the holder. The ring 6 on the lower generator-section closely fits over the upper end of a cylindrical vessel 13, this vessel also serving as an air-chamber to further compensate for the weight of the holder and its parts in the tank. The lower end of the vessel 13 is provided with hooks 14, with which engage spring-arms 15, pivotally secured to the lower edge of the gas-holder, thus securing the generator in the gas-holder. Spring-clips 16, secured to the outer surface of the gas-holder, serve to hold the spring-arms 15 out of the way when not in use, as will be evident. Across the lower edge of the top of the gas-holder, which top slopes upward from the edge to the center, is secured a plate 17, of metallic cloth, serving as a strainer to partially remove particles of carbon from the gas.

The top of holder B is centrally provided with a screw-threaded hole 18, adapted to receive one end of a short length of coupling-tube 19, the other end of which is secured to the purifier.

D represents the purifier, comprising a cylindrical casing 20, the lower end of which slopes downwardly from the edge toward the center and is centrally provided with an inlet-opening 21, into which the end of coupling-tube 19 is screwed. The interior construction of the purifier comprises a number of metallic plates $d$ and $d'$, the former being of slightly-less diameter than the casing 20 and the latter of the full diameter thereof, these plates being arranged one above the other alternately, as shown in Fig. 1. The lower plate $d$ is solid and slopes upward from its edge toward the center. The plate $d'$ next above is secured to the side of the casing and slopes downward from its edge toward the center, a central hole 22 affording passage for the gas. The plate $d'$, which, as before described, is secured to the side of casing 20, supports the plate $d$ by studs 23, depending from it and secured to plate $d$, these plates $d$ and $d'$ being thus arranged alternately throughout the purifier intermediate the inlet 21 and an outlet 24, centrally formed in the upper end of casing 20, as shown. Between the lower plate $d$ and the bottom of casing 20 is secured a strainer 25, of metallic cloth, serving to assist in removing foreign substances from the gas.

It will be seen from the above-described construction that the gas, after entering and before leaving the purifier, is compelled to travel a long sinuous path and be alternately contracted and allowed to expand between plates $d$ and $d'$ during such travel, thereby causing the deleterious substances which would otherwise deposit in the conduits and burners to be entirely removed from the gas and deposited on the plates $d$ and $d'$, whereby the gas is delivered to the burners in a highly-improved condition.

I prefer to mount my apparatus on a framework for convenience in handling, this framework comprising a base-board 26, to which the tank A is to be secured, and an upright 27, rising from one end of the base-board. One end of a delivery-pipe 28 is secured to the upright 27, as shown, its other leading to the point of utilization of the gas.

29 represents a short length of pipe secured in the outlet-opening 24 of the purifier D, this pipe being provided with a stop-cock 30 for regulating the delivery of gas from the apparatus. Intermediate the delivery-pipe 28 and the pipe 29 the conduit for the gas comprises a number of short lengths of pipe 31, connected by ordinary swiveling-joints 32, by means of which the necessary vertical movement of the gas-holder and its attendant parts in the tank is permitted, and also allowing these parts to be removed from and swung away from the tank when desired to recharge the apparatus. The securing of the delivery-pipe to the upright 27 permits the above-described movement of the gas-holder and its parts without in any manner disturbing the delivery-pipe, as will be evident.

In order to permit the slightest excess of pressure of the gas generated to automatically control the contact of the water and carbid, I have provided my apparatus with the above-described air-chambers $b$ and the air-chamber 13, secured to the lower generator-section. These air-chambers are of sufficient buoyant power to nearly compensate for the weight of the gas-holder, the generator, the purifier, and the gas-conduit when the apparatus is in an operative position in the water contained in tank A. The result of this construction is that the gas-holder and its attendant parts, when not in active operation, will very gradually sink in the water, but on a slight over-generation of gas sufficient pressure is exerted to raise the holder and withdraw the carbid from contact with the water and practically stop the generation of gas. The stop-cocks 3 on each air-chamber $b$ may be opened and a small quantity of water allowed to rise in the air-chambers, which would slightly reduce the buoyant power of the air-chambers, by which construction I am enabled to regulate the buoyancy of the apparatus in the water to suit all conditions.

The water will, in the active operation of the apparatus, gradually rise in the holder, standing somewhat higher on the outside than on the inside thereof, owing to the pressure within the holder. The result of this would be that when the holder has descended a sufficient distance to permit the water to contact with the carbid in the upper generator-section the water on the outside of the holder would overflow the top thereof and by its weight cause the holder to suddenly sink, thereby causing a sudden generation of gas to a dangerous degree. In order to remedy this objection, I have extended the sides of the holder upward, as at 2, this also serving as a receptacle in which the purifier may be placed.

The operation of my improved apparatus is as follows: The purifier is secured to the gas-holder by means of the coupling-tube 19, the gas-conduit and delivery-pipe properly connected, and water poured into the tank A until on a level with the handles 1. Calcium carbid or other like chemical solid is then placed in the carbid-rings 5 of each section $c$, the sections assembled in the above-described manner and locked in the gas-holder, and the apparatus is ready for operation. The stop-cock 30 in pipe 29 is opened to permit the escape of air contained in the gas-holder, said holder and its attendant parts gradually sinking in the water until the latter enters the holes 7 in the lower carbid-ring 5, contacts with the carbid and generates gas, and on sufficient gas being generated to expel all air from the holder the stop-cock 30 is closed until the gas is desired for use. The gas now flows through the openings 8 in ring 6, around plate 4, up through plate 12, through strainer 17, through coupling-tube 19, and into the purifier, wherein, as before described, the deleterious substances are removed from the gas and the gas delivered through the purifier-outlet 24 to the delivery-pipe. It will be seen that by this construction the gas generated in one section can have no material effect on the carbid in any of the other sections, nor will the vapor rising from the water during the period when gas is being generated materially affect the portions of carbid in any other section than that in which the water enters; and also, owing to the construction of the purifier, I am enabled to remove all deleterious substances from the gas before delivering the same in the delivery-pipe, thus preventing the deposit of such substances in the conduits and burners and causing the flame from the burner-tips to be regular and free from smoking.

It is to be understood that as the carbid in one section is decomposed the gas-holder and its parts will gradually sink until the water reaches the next section, and so on throughout the generator, whereby by placing only a given quantity of carbid in each section I am enabled to absolutely regulate the quantity of gas to be generated in a fixed period.

Having thus described my invention, what I claim as new, and desire to secure by Letters Patent, is—

1. In a gas-making apparatus, a generator comprising a plurality of sections arranged to partially telescope one within the other, each of said sections being adapted to contain a quantity of calcium carbid or other suitable chemical and having suitable inlets for water or other liquid and outlets for the gas generated in the section below.

2. In a gas-making apparatus, the combination, with the gas-holder, of a generator comprising a plurality of independent sections arranged one upon another, the lower section being provided with one or more hooks, and spring-arms secured to the gas-holder and adapted to engage the hooks on the section, whereby the generator is locked in the gas-holder.

3. In a gas-making apparatus, a generator comprising a plurality of sections, arranged one upon another, each of said sections consisting of a plate and an upper and a lower ring secured thereto, the upper ring being adapted to contain a quantity of calcium carbid or other like chemical and having inlets for water or other liquid, said lower ring being provided with outlets for the gas generated in the section below.

4. In a gas-making apparatus, a generator consisting of a plurality of sections, each comprising a horizontal plate, a carbid-ring rising from the plate, and a lower ring depending from the plate, the sections being assembled by partially telescoping the carbid-ring on one section in the lower ring on the section next above, the carbid-ring having inlets for water or other liquid and the lower ring being provided with outlets for the gas.

5. In a gas-making apparatus, the combination, with a tank for containing water or other suitable liquid, of a gas-holder and a generator combined into one receptacle adapted for vertical movement in the tank, the generator comprising a plurality of independent sections arranged to partially telescope one within the other, said receptacle being provided with suitably-arranged air-chambers for buoyantly compensating for its weight in the liquid, the air-chambers also serving as guides for the receptacle during its vertical movement in the tank.

6. In a gas-making apparatus, the combination with the generator and gas-holder, of a purifier secured to the gas-holder, said purifier comprising a casing and a series of metallic plates therein, said plates being arranged in pairs, the upper plate of each pair being of the same diameter as the casing and provided with a central opening, the lower plate being of slightly less diameter than the casing and solid, the lower plate of each pair being secured to and held in position by one or more studs depending from the upper plate of each pair, substantially as and for the purposes stated.

7. In a gas-making apparatus, the combination, with a tank for containing water or other suitable liquid, of a gas-holder and a generator combined into one receptacle adapted for vertical movement in the tank, and a plurality of air-chambers secured at equidistant points to the outer surface of the receptacle and adapted to bear against the inner surface of the tank, whereby the weight of the receptacle in the tank is buoyantly compensated for, and the receptacle maintained in an upright position during its vertical movement in the tank.

In testimony whereof I affix my signature in presence of two witnesses.

FLAVEL SIMONSON.

Witnesses:
EPHRIAM M. EBERSOLE,
CARRIE GETTEL.